United States Patent
Bays-Muchmore et al.

(10) Patent No.: US 6,845,944 B2
(45) Date of Patent: Jan. 25, 2005

(54) MULTI-POSITIONAL TAIL SKIDS AND ASSOCIATED METHODS OF USE

(75) Inventors: C. Byram Bays-Muchmore, Bellevue, WA (US); Todd B. Brouwer, Duvall, WA (US); Malcolm S. Bryant, Maple Valley, WA (US); Warren D. Burggraf, Fall City, WA (US); Daniel S. Little, Bellevue, WA (US); Douglas G. Miller, North Bend, WA (US); Stanley E. Tolzmann, Kirkland, WA (US); Martin M. Withington, Seattle, WA (US); Thomas A. Zierten, Bellevue, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/411,682

(22) Filed: Apr. 11, 2003

(65) Prior Publication Data

US 2004/0200930 A1 Oct. 14, 2004

(51) Int. Cl.$^7$ .............................................. B64C 25/00
(52) U.S. Cl. ..................................................... 244/109
(58) Field of Search ........................ 244/100 R, 103 R, 244/104 FP, 104 LS, 104 R, 102 R, 108, 109, 17.11

(56) References Cited

U.S. PATENT DOCUMENTS

| | | | | |
|---|---|---|---|---|
| 1,515,577 A | * | 11/1924 | Gentzcke | 244/102 R |
| 2,355,210 A | * | 8/1944 | Eddy | 244/109 |
| 3,252,548 A | * | 5/1966 | Pajak et al. | 244/109 |
| 3,493,082 A | * | 2/1970 | Bell | 244/109 |
| 4,528,564 A | * | 7/1985 | Trampnau | 244/17.11 |
| 4,815,678 A | * | 3/1989 | Gaqne | 244/109 |
| 5,901,927 A | * | 5/1999 | Ho | 244/183 |
| 5,984,229 A | * | 11/1999 | Hollowell et al. | 244/12.4 |

* cited by examiner

Primary Examiner—Galen Barefoot
(74) Attorney, Agent, or Firm—Perkins Coie LLP (57) ABSTRACT

Multi-positional tail skid assemblies and methods for their use. In one embodiment, a multi-positional tail skid assembly includes a skid member and a skid deployment system operably connected to the skid member. The skid member can include a first portion attachable to an aft portion of a fuselage and a second portion movable relative to the aft portion of the fuselage. The second portion can support a skid surface configured to contact a surface of a runway. The skid deployment system can be configured to move the skid surface between first and second positions. When the skid surface is in the first position, the skid surface is closer to the aft portion of the fuselage than when the skid surface is in the second position.

49 Claims, 7 Drawing Sheets

MULTI-POSITIONAL TAIL SKIDS AND ASSOCIATED METHODS OF USE

TECHNICAL FIELD

The following disclosure relates generally to aircraft tail skids and, more particularly, to tail skids for use with aircraft having tricycle-type landing gear configurations.

BACKGROUND

Many conventional jet aircraft use a tricycle-type landing gear configuration. This configuration typically includes left and right main gears extending downwardly from the main wing, and a nose gear extending downwardly from a forward portion of the fuselage. For takeoff, such aircraft generally build up airspeed while on the nose gear and main gears, and then rotate about the main gears to a nose-up position for lift off. This rotation causes the tail of the aircraft to move downwardly toward the runway surface. Although the tail rarely contacts the runway, a tail skid or other protective device is often provided at the contact point to prevent fuselage damage in the unlikely event that contact does occur.

During landing, aircraft with tricycle-type landing gear configurations typically approach the runway in a slightly nose-up attitude that is somewhat less inclined than at takeoff. Upon touchdown, the downward momentum of the aircraft causes the main gears to compress, again bringing the tail of the aircraft into relatively close proximity to the surface of the runway. When the main gears are compressed, however, the tail skid may not be in a position to prevent fuselage damage if the aircraft over-rotates during landing. For this reason, the nose-up attitude of conventional aircraft is generally limited during the landing approach to provide an acceptable margin between the tail of the aircraft and the runway surface at touchdown.

Some jet aircraft that rotate about main gears for takeoff include movable tail skids. Such aircraft include, for example, the Boeing 757, 767, and 777 families of aircraft. On these aircraft, the tail skids are typically extended away from the fuselage for both take off and landing, and retracted toward the fuselage to reduce aerodynamic drag during flight. These tail skid are configured to absorb energy from incidental runway contact only in the extended position.

In many situations, it may be advantageous to reduce landing speeds of aircraft having tricycle-type landing gear configurations. For example, certain commercial aircraft operators may desire lower approach speeds for service to selected airports having shorter runways. In addition, certain operators may desire increased payload weights. Lower approach speeds and increased payload weights, however, often dictate that the aircraft assume a higher nose-up attitude during the approach. As explained above, however, this nose-up attitude may be limited to avoid fuselage damage from incidental runway contact.

SUMMARY

Aspects of the invention are directed to multi-positional tail skid assemblies for use with aircraft. In one embodiment, a tail skid assembly for use with an aircraft includes a skid member and a skid deployment system. The skid member can include a first portion attachable toward an aft portion of the fuselage and a second portion having a skid surface. The skid deployment system can be operably connected to the skid member to move the skid surface between first and second positions relative to the aft fuselage portion. When the skid surface is in the first position, the skid surface is closer to the aft portion of the fuselage than when the skid surface is in the second position. The skid surface is configured to contact a surface of a runway and prevent damage to the aft fuselage portion when the skid surface is in the first and second positions.

In another embodiment, a method for protecting a portion of an aircraft fuselage includes moving a skid surface configured to contact a surface of a runway to a first position for takeoff of the aircraft. The aircraft can include a skid member having first and second portions. The first portion of the skid member can be attached toward an aft portion of the fuselage, and the second portion of the skid member can support the skid surface and be movable relative to the aft portion of the fuselage. The method can further include moving the skid surface to a second position for landing of the aircraft. When the skid surface is in the first position, the skid surface is closer to the aft portion of the fuselage than when the skid surface is in the second position.

DETAILED DESCRIPTION

The following disclosure describes aircraft tail skid assemblies and associated methods of use. Certain specific details are set forth in the following description and in FIGS. 1A–7 to provide a thorough understanding of various embodiments of the invention. Certain specific details describing well-known structures and systems often associated with aircraft, however, are not set forth to avoid unnecessarily obscuring the description of the various embodiments of the invention. Dimensions, angles, and other specifications shown in the figures are merely illustrative of particular embodiments of the invention. Accordingly, other embodiments can have other dimensions, angles, and specifications without departing from the spirit or scope of the present invention. In addition, those of ordinary skill in the relevant art will understand that embodiments of the invention can be practiced without several of the details described below.

In the figures, identical reference numbers identify identical or at least generally similar elements. To facilitate the discussion of any particular element, the most significant digit or digits of any reference number refer to the figure in which that element is first introduced. For example, element 410 is first introduced and discussed with reference to FIG. 4.

Figure 1A:
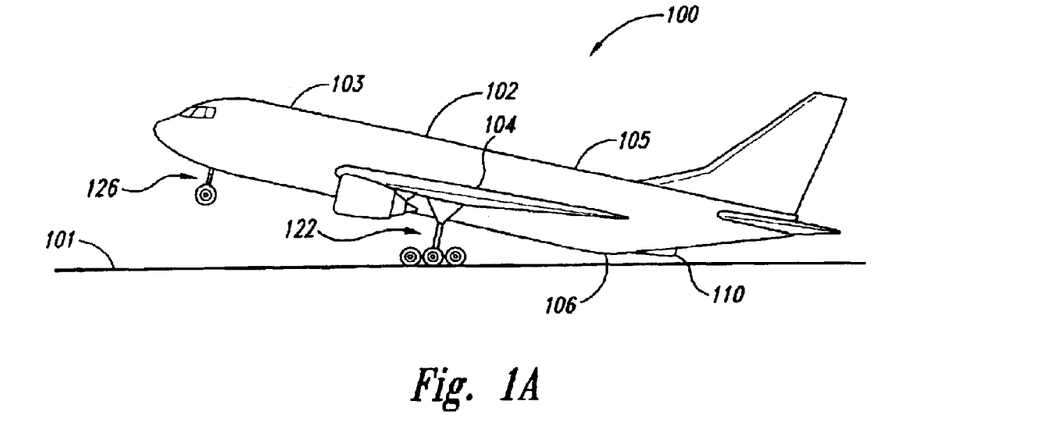
FIGS. 1A and 1B are side elevation views of an aircraft having a multi-positional tail skid assembly in accordance with an embodiment of the invention.
Figure 1B:
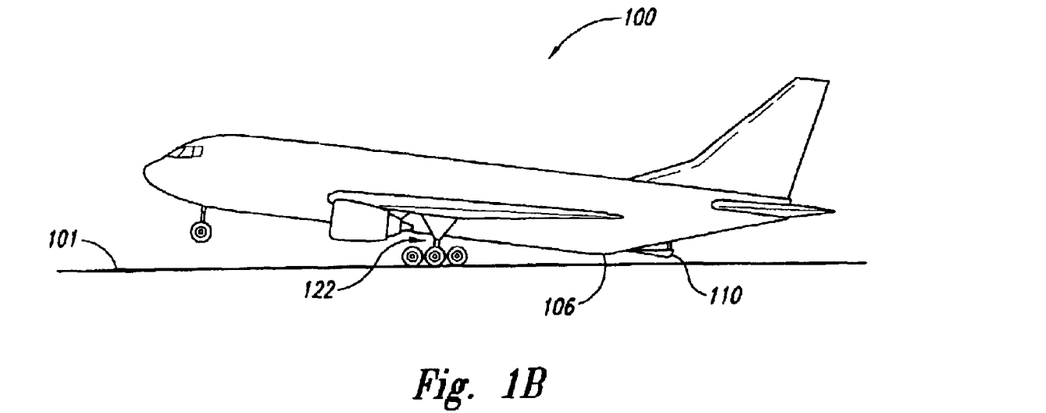

FIGS. 1A and 1B are side elevation views of an aircraft 100 having a multi-positional tail skid assembly 110 in accordance with an embodiment of the invention. In FIG. 1A, the aircraft 100 is taking off from a runway 101, and the tail skid assembly 110 is in a first or retracted position. In FIG. 1B, the aircraft 100 is landing on the runway 101, and the tail skid assembly 110 is in a second or extended position. Referring first to FIG. 1A, in one aspect of this embodiment, the aircraft 100 includes a fuselage 102 having a forward fuselage portion 103 and an aft fuselage portion 105. The tail skid assembly 110 is positioned toward the aft fuselage portion 105 proximate to an aft body contact point 106. The aircraft 100 can further include a main wing 104 attached to the fuselage 102 at least generally between the forward fuselage portion 103 and the aft fuselage portion 105. In another aspect of this embodiment, the aircraft 100 has a tricycle-type landing gear configuration that includes left and right main landing gears 122 extendable downwardly from at least proximate to the main wing 104, and a nose landing gear 126 extendable downwardly from the forward fuselage portion 103.

As the aircraft 100 rotates upwardly about the main landing gears 122 prior to liftoff from the runway 101, the main wing 104 generates sufficient lift to relieve the compression load on the main landing gears 122. As a result, the main landing gears 122 extend as shown in FIG. 1A. If the aircraft 100 continues to rotate, the tail skid assembly 110 may ultimately contact the runway 101 and prevent further rotation. In so doing, the tail skid assembly 110 prevents the aft body contact point 106 from contacting the runway 101 and sustaining damage.

Referring next to FIG. 1B, the aircraft 100 is illustrated in a landing mode just after touching down on the runway 101. In this mode, the weight and downward momentum of the aircraft 100 exert a substantial compression force on the main landing gears 122 causing them to compress. When the main landing gears 122 are compressed as shown in FIG. 1B, higher nose-up attitudes of the aircraft 100 will cause the aft body contact point 106 to contact the runway 101 if the tail skid assembly 110 is left in the retracted position as shown in FIG. 1A. With the tail skid assembly 110 deployed to the extended position as shown in FIG. 1B, however, the tail skid assembly 110 will contact the runway 101 before the aft body contact point 106 does. As a result, the tail skid assembly 110 can prevent damage to the aft body contact point 106 from incidental runway contact if the aircraft 100 over-rotates during landing.

The landing gear configuration shown in FIGS. 1A and 1B is provided solely for purposes of illustration. Accordingly, in other embodiments, the multi-positional landing gear assembly 110 can be used with other aircraft having other landing gear configurations. For example, in one other embodiment, such aircraft can have main landing gears extendable downwardly from the fuselage instead of the main wing. In another embodiment, such aircraft can have main landing gears extendable downwardly from the fuselage and the main wing. Thus, throughout this disclosure, references to a tricycle-type landing gear configuration will be understood to include all of the foregoing landing gear configurations. Further, it is expected that aspects of the tail skid assembly 110 disclosed herein can be used with any aircraft that rotates nose-upwardly about main landing gears for takeoff.

Although the tail skid assembly 110 as described above is movable between two positions, in other embodiments, a multi-positional tail skid assembly in accordance with the present disclosure could be movable between three or more positions. For example, in one other embodiment, such a tail skid assembly could have a first extended position for takeoff, a second different extended position for landing, and a third fully retracted position for cruise flight.

One feature of aspects of the invention illustrated in FIGS. 1A and 1B is that the tail skid assembly 110 is configured to provide impact protection in both the retracted and extended positions, rather than just the extended position. This feature allows the position of the tail skid assembly 110 to be selected to suit the particular flight mode. For example, an operator can select the retracted position (as shown in FIG. 1A), allowing the aircraft 100 to achieve full rotation during takeoff and reduced aerodynamic drag during flight. The operator can select the extended position (as shown in FIG. 1B), allowing the aircraft 100 to achieve full rotation during the landing approach for reduced approach speeds.

In one embodiment, the multi-positional tail skid assembly 110 can allow aircraft such as the Boeing 737-900X and the Boeing 737-800 to reduce approach speeds or increase the performance-limited landing weight. These increased performance parameters can correspond to an increased angle of attack during landing.

Figure 2A:
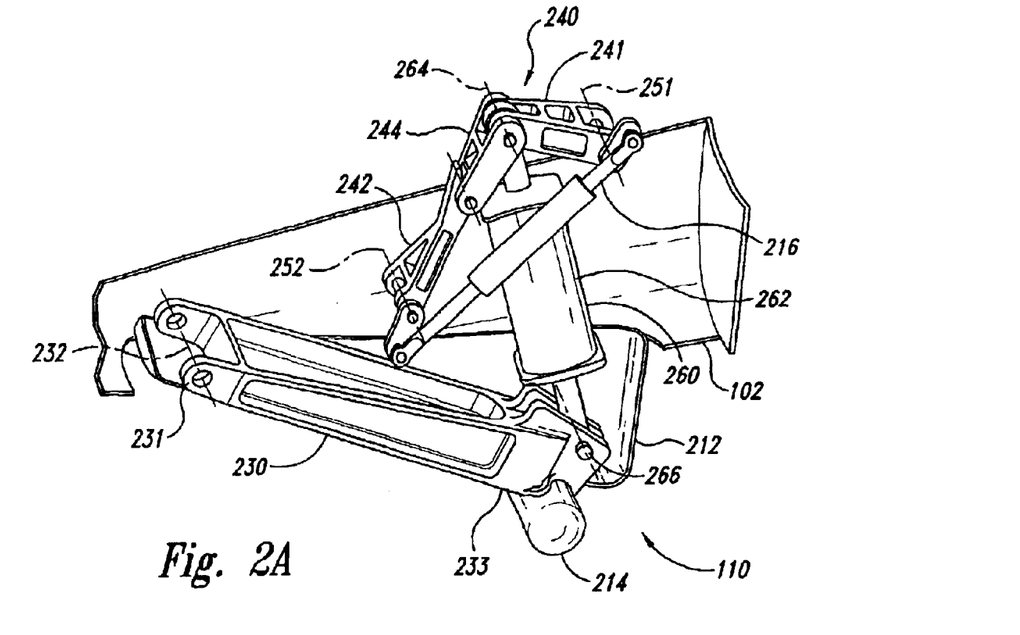
FIGS. 2A and 2B are enlarged partially cutaway isometric views of a tail skid assembly in accordance with an embodiment of the invention.
Figure 2B:
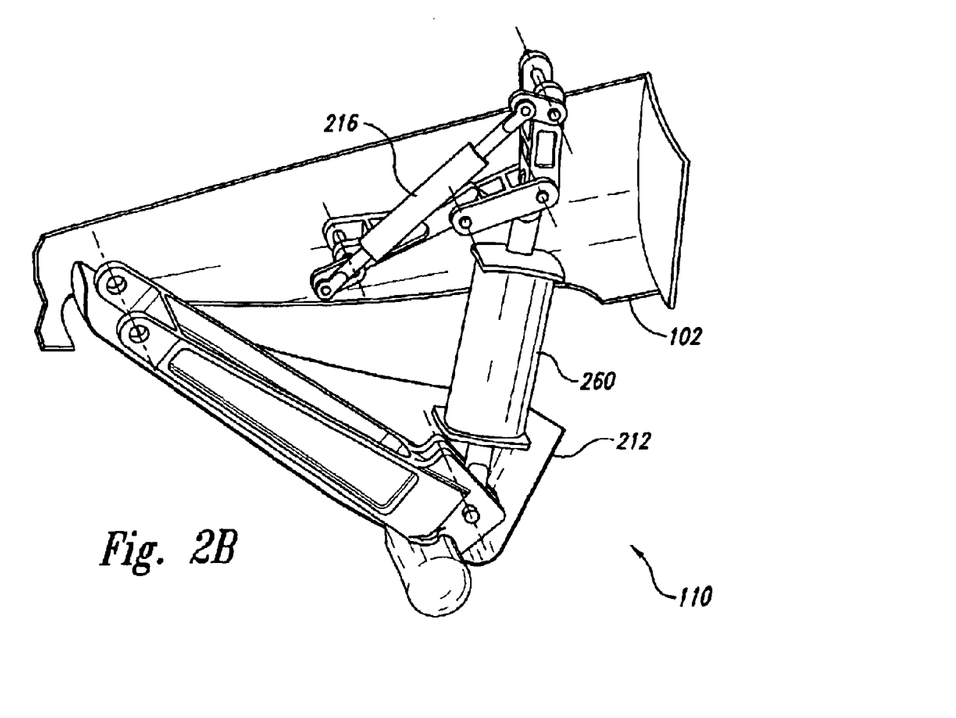

FIGS. 2A and 2B are enlarged partially cutaway isometric views of the tail skid assembly 110 in accordance with an embodiment of the invention. In FIG. 2A, the tail skid assembly 110 is illustrated in the first or retracted position. In FIG. 2B, the tail skid assembly 110 is illustrated in a second or extended position. Referring first to FIG. 2A, in one aspect of this embodiment, the tail skid assembly 110 includes a skid member 230, a skid deployment system 240, and a compression member or strut 260 extending at least partially between the skid deployment system 240 and the skid member 230. The skid member 230 can include a first portion 231 and a second portion 233. The first portion 231 can be pivotally attached to the aft fuselage portion 105 to rotate relative to the aft fuselage 105 about a skid pivot axis 232. The second portion 233 can include a "shoe" having a skid surface 214. The skid surface 214 can include materials configured to contact and move against a runway surface without sustaining significant damage or generating sparks from abrasion. Such materials may include nickel alloys such as Inconnel 718, high-strength steels, and other metals or robust materials. In other embodiments, the second portion 233 of the skid member 230 can include other features for incidental runway contact. For example, in one other embodiment, the second portion 233 can include a roller device such as a wheel for rolling over the runway surface.

In another aspect of this embodiment, the tail skid assembly 110 includes a fairing 212 enclosing at least a portion of the skid member 230 and configured to move with the skid member 230. In the illustrated embodiment, the fairing 212 encloses all but the skid surface 214 of the skid member 230. The fairing 212 can fit at least generally flush against the aft fuselage portion 105 when the tail skid assembly 110 is in the retracted position as shown in FIG. 2A. In this configuration, the fairing 212 can reduce aerodynamic drag caused by the tail skid assembly 110 during flight, while still leaving the skid surface 214 exposed to serve its function during takeoff and landing. In other embodiments, the fairing 212 can be incorporated into the skid member 230 and can include the skid surface 214.

In a further aspect of this embodiment, the skid deployment system 240 includes a first linkage 241 and a second linkage 242. The first linkage 241 can be pivotally attached to the aft fuselage portion 105 about a first linkage pivot axis 251. Similarly, the second linkage 242 can be pivotally attached to the aft fuselage portion 105 to pivot about a second linkage pivot axis 252. A coupling 244 can pivotally connect a distal end of the first linkage 241 to a distal end of the second linkage 242. In yet another aspect of this embodiment, an actuator 216 is operably connected between the first linkage 241 and the second linkage 242. The actuator 216 can be extendable and retractable along its longitudinal axis causing the first linkage 241 and the second linkage 242 to cooperatively pivot about their respective pivot axes. In one embodiment, the actuator 216 can be hydraulically activated. In other embodiments, other types of actuators can be used to cooperatively pivot the first linkage 241 and the second linkage 242. For example, in one other embodiment, the actuator 216 can be a pneumatic actuator. In another embodiment, the actuator 216 can be an electromechanical actuator. In yet other embodiments, other deployment systems with other types of actuators can be used to move the skid member 230 between the retracted position (FIG. 2A) and the extended position (FIG. 2B) without departing from the spirit or scope of the present disclosure.

In a further aspect of this embodiment, the strut 260 includes a first end 264 and a second end 266. The first end 264 can be pivotally attached to the skid deployment system 240 at least proximate to the distal end of the first linkage 241. The second end 266 can be pivotally attached to the skid member 230 at least proximate to the second portion 233. Accordingly, the strut 260 couples the skid deployment system 240 to the skid member 230 such that extension of the actuator 216 results in downward movement of the skid member 230, and contraction of the actuator results in upward movement of the skid member 230.

In yet another aspect of this embodiment, the strut 260 includes an energy-absorbing portion 262 positioned between the first end 264 and the second end 266. The energy-absorbing portion 262 can be configured to absorb the energy associated with incidental contact between the skid surface 214 and a runway surface during takeoff or landing. For example, in one embodiment, the energy-absorbing portion 262 can include an aluminum honeycomb material. In a further aspect of this embodiment, the honeycomb material can be part of a changeable cartridge that is replaced after compression. In other embodiments, other energy-absorbing materials can be used. For example, in one other embodiment, the energy absorbing portion 262 can include a spring element or a hydraulically damped element. In yet other embodiments, other types of energy absorbing or compressible elements can be used. In still further embodiments, the energy absorbing portion 262 can be omitted.

As mentioned above, FIG. 2A illustrates the tail skid assembly 110 in the first or retracted position. In this position, the actuator 216 is extended, causing the first and second linkages 241, 242 to hold the strut 260 in an upper position with the skid member 230 and fairing 212 positioned proximate to the aft fuselage portion 105, e.g., for takeoff and cruise flight. Referring next to FIG. 2B, contraction of the actuator 216 causes the first and second linkages 241, 242 to rotate downwardly. As a result, the strut 260 moves lower causing the fairing 212 and the skid member 230 to pivotally move away from the aft fuselage portion 105 toward the extended position, e.g., for landing.

Figure 3A:
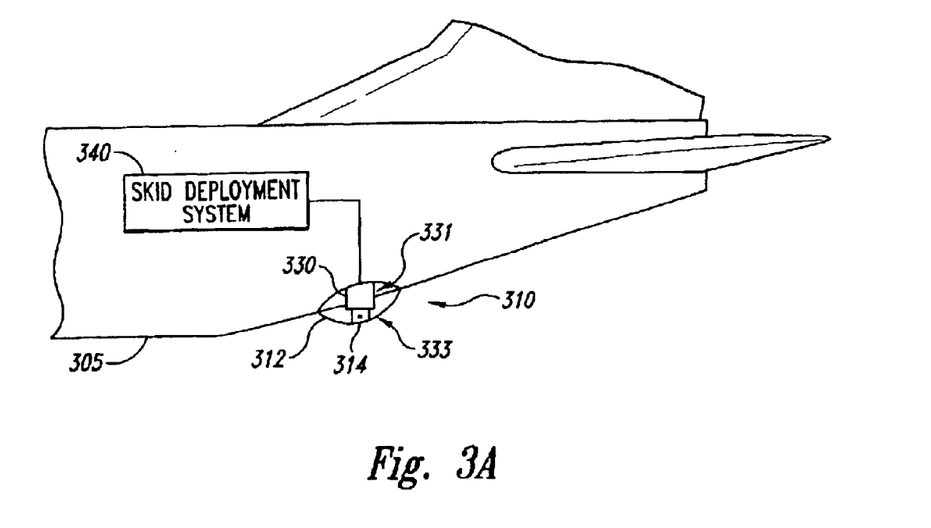
FIGS. 3A and 3B are partially cutaway side elevation views of an aft fuselage portion having a tail skid assembly in accordance with another embodiment of the invention.
Figure 3B:
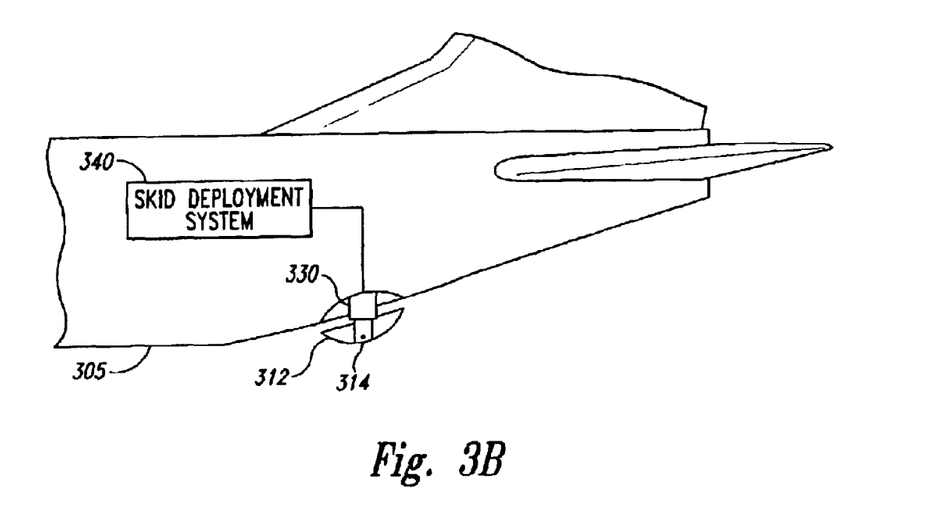

FIGS. 3A and 3B are partially cutaway side elevation views of an aft fuselage portion 305 having a tail skid assembly 310 configured in accordance with another embodiment of the invention. In FIG. 3A, the tail skid assembly 310 is shown in a first or retracted position, e.g., for takeoff and cruise flight. In FIG. 3B, the tail skid assembly 310 is shown in a second or extended position, e.g., for landing. Referring first to FIG. 3A, in one aspect of this embodiment, the tail skid assembly 310 includes a skid member 330 operably connected to a skid deployment system 340 (shown schematically). The skid member 330 can include a first portion 331 and a second portion 333. The first portion 331 can be attached to the aft fuselage portion 305, and the second portion 333 can be movable relative to the aft fuselage portion 305 by the skid deployment system 340. In another aspect of this embodiment, the second portion 333 can support a skid surface 314 configured to incidentally contact a surface of a runway during takeoff or landing. In the illustrated embodiment, the skid surface 314 is incorporated into a fairing 312 that reduces aerodynamic drag on the tail skid assembly 310 during flight.

Referring to FIGS. 3A and 3B together, in a further aspect of this embodiment, the skid member 330 can be a telescoping member, and the skid deployment system 340 can include a hydraulic system configured to extend and retract the skid member 330 between the retracted position shown in FIG. 3A and the extended position shown in FIG. 3B. In other embodiments, the skid deployment system 340 can include other systems for moving the skid surface 314 relative to the aft fuselage portion 305. For example, in one other embodiment, the skid deployment system 340 can be a pneumatic system. In another embodiment, the skid deployment system 340 can be an electromechanical system. Based on the foregoing, those of ordinary skill in the relevant art will appreciate that in yet other embodiments the tail skid assembly 310 can include other skid member configurations and other skid deployment system configurations.

Figure 4:
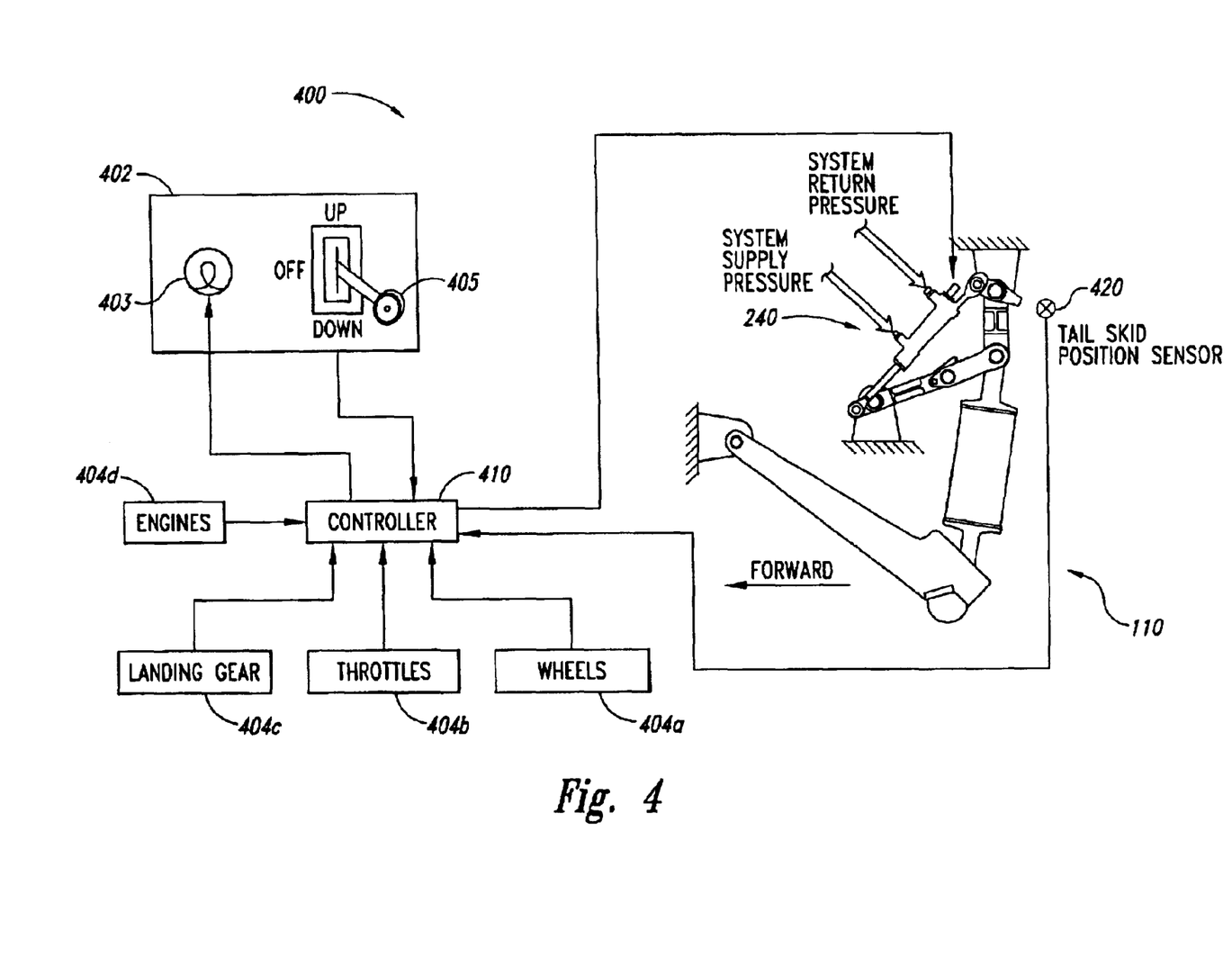
FIG. 4 is a schematic diagram of a skid control system in accordance with an embodiment of the invention.

FIG. 4 is a schematic diagram of a skid control system 400 configured in accordance with an embodiment of the invention. In one aspect of this embodiment, the skid control system 400 includes a deployment controller 410 configured to send commands to the skid deployment system 240 based on inputs from various flight systems 404. Such flight systems can include, for example, landing wheels 404a, engine throttles 404b, a landing gear lever 404c, and engines 404d. As explained in greater detail below, in another aspect of this embodiment, the deployment controller 410 can send a "tail skid up" command to the skid deployment system 240 when one or more inputs from the flight systems 404 indicate that the aircraft is not approaching a landing. For example, the deployment controller 410 can send such a command when the aircraft is taxiing, taking off, or in cruise flight. Alternatively, the deployment controller 410 can send a "tail skid down" command to the skid deployment system 240 when one or more inputs from the flight systems 404 indicate that the aircraft is approaching a landing.

In a further aspect of this embodiment, the skid control system 400 can include one or more flight deck instruments 402, and a skid position sensor 420 positioned at least proximate to the skid deployment system 240. The flight deck instruments 402 can include a disagree or warning light 403, and a control switch 405. The control switch 405 can be used by maintenance personnel to actuate the tail skid assembly 110 for routine maintenance or inspection. The warning light 403 can provide pilots with a visual warning when the tail skid assembly 110 is not in the proper position. For example, as explained in greater detail below, if the deployment controller 410 sends a "tail skid down" command to the skid deployment system 240, and the skid position sensor 420 senses that the tail skid assembly 110 has not moved to the extended position within an allotted period of time, then the warning light 403 will illuminate on the flight deck of the aircraft. After seeing the light, the pilot may elect to limit the angle of attack on approach to a shallower angle than would otherwise be possible with the tail skid assembly 110 in the extended position.

Figure 5:
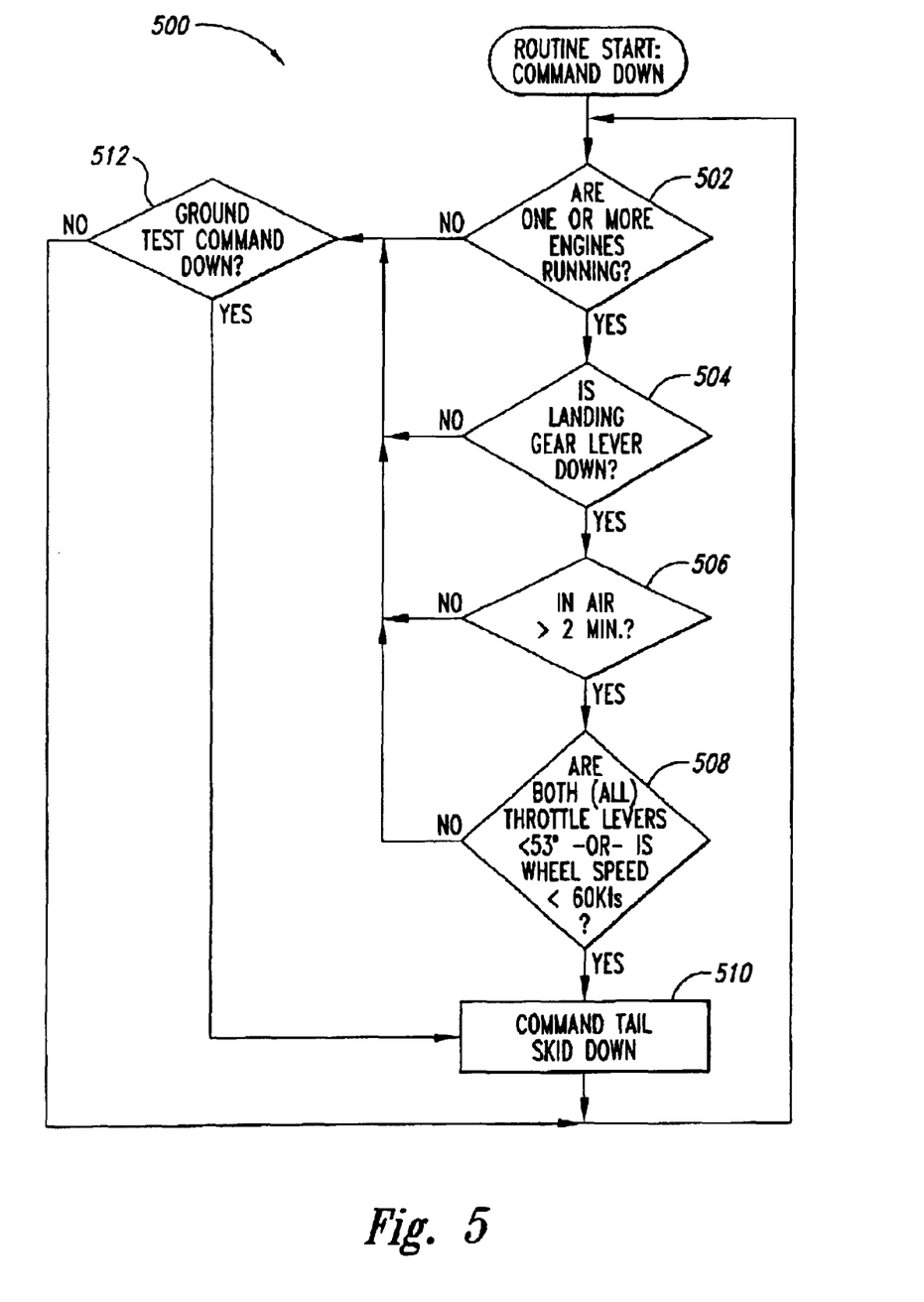
FIG. 5 is a flow diagram illustrating a routine for commanding a tail skid assembly to a down or extended position in accordance with an embodiment of the invention.

FIG. 5 is a flow diagram illustrating a routine 500 for commanding a tail skid assembly to a down or extended position in accordance with an embodiment of the invention. In one aspect of this embodiment, the routine 500 can be implemented by the deployment controller 410 of FIG. 4 in accordance with computer-readable instructions stored on a suitable computer-readable medium. In other embodiments, the routine 500 can be implemented by other tail skid or landing gear control systems having suitable facilities for executing such computer-readable instructions.

In another aspect of this embodiment, the routine 500 can start when the aircraft is initially powered-up. Once started, the routine 500 proceeds to decision block 502 and determines whether one or more of the engines are running. If one or more of the engines are running, then in decision block 504 the routine 500 determines whether the landing gear lever is in the down position. If the landing gear lever is in the down position, then in decision block 506 the routine 500 determines whether the aircraft has been airborne for more than two minutes. If the aircraft has been airborne for more than two minutes, then in decision block 508 the routine 500 determines whether both throttle levers are set at less than 53° or, alternatively, if the landing wheel speed is less than 60 knots. If the throttle levers are set to less than 53°, or alternatively, if the wheel speed is less than 60 knots, then in block 510 the routine 500 commands the tail skid to the down position, and the routine 500 repeats.

In a further aspect of this embodiment, if any one of the decision blocks 502, 504, 506 and 508 is answered in the negative, then the routine 500 proceeds to decision block 512 to determine whether the tail skid has been commanded to the down (i.e., the extended) position for a ground test operation (for example, by operation of the control switch 405 of FIG. 4). If the tail skid has been commanded down for a ground test, then the routine 500 proceeds to block 510 and accordingly commands the tail skid to the down position. If not, then the routine 500 repeats without sending any command to the tail skid assembly. Accordingly, the routine 500 represents one method for determining whether the aircraft is approaching a landing such that the tail skid should be moved to the down position. In other embodiments, other routines using other flight parameters can be used to determine whether the aircraft is approaching a landing.

Figure 6:
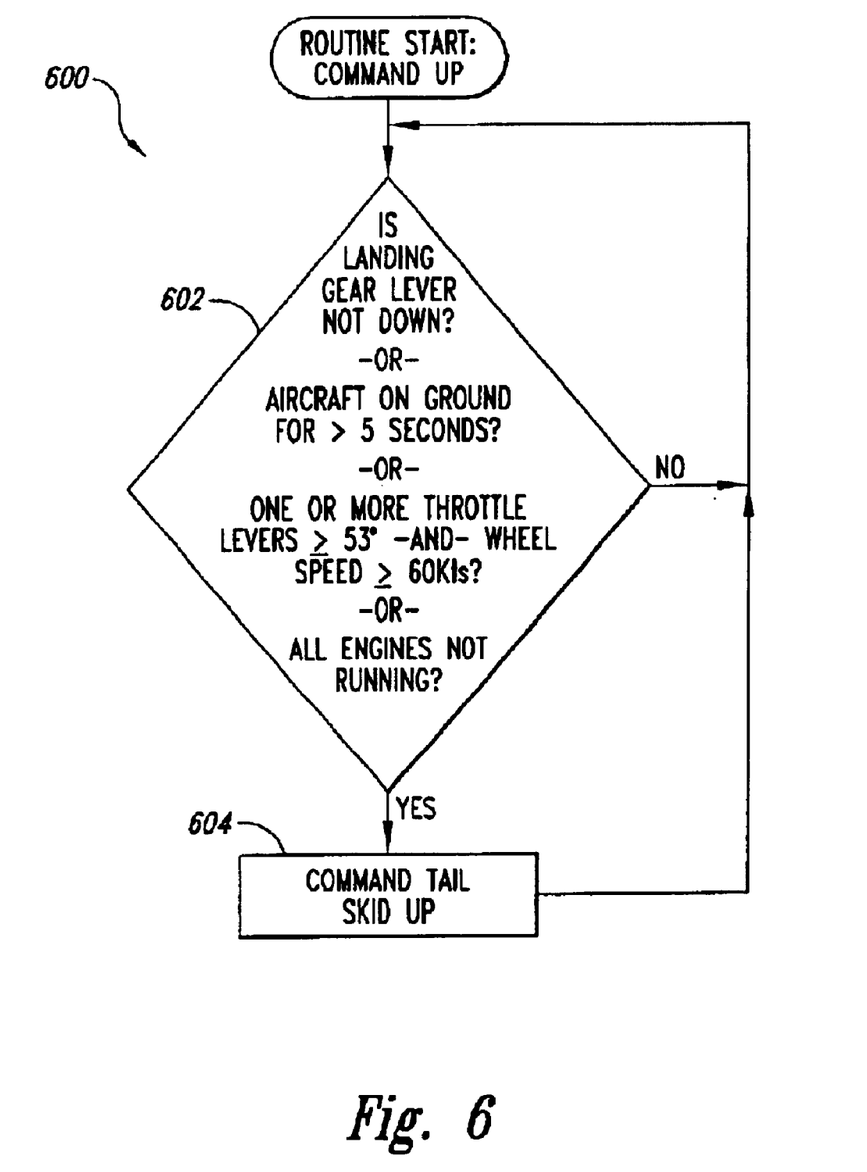
FIG. 6 is a flow diagram illustrating a routine for commanding a tail skid to an up or retracted position in accordance with an embodiment of the invention.

FIG. 6 is a flow diagram illustrating a routine 600 for commanding a tail skid to an up or retracted position in accordance with an embodiment of the invention. Once started, the routine 600 proceeds to the decision block 602 to determine whether (1) the landing gear lever is in the up position, or (2) the aircraft has been on the ground for more than five seconds, or (3) one or more of the throttle levers are set at 53° or more and the wheel speed is equal to 60 knots or more, or (4) all of the engines are not running. If any one of the foregoing inquiries is answered in the affirmative, then the routine 600 proceeds to block 604 and sends a tail skid up command to the tail skid deployment system. After block 604, the routine 600 repeats. If, however, none of the inquiries in decision block 602 is answered in the affirmative, then the routine 600 repeats without sending any command to the tail skid deployment system. Accordingly, the routine 600 represents one method for determining whether the aircraft is in a takeoff or cruise flight mode, or is on the ground after initial touchdown, such that the tail skid should be moved to the up or retracted position.

Figure 7:
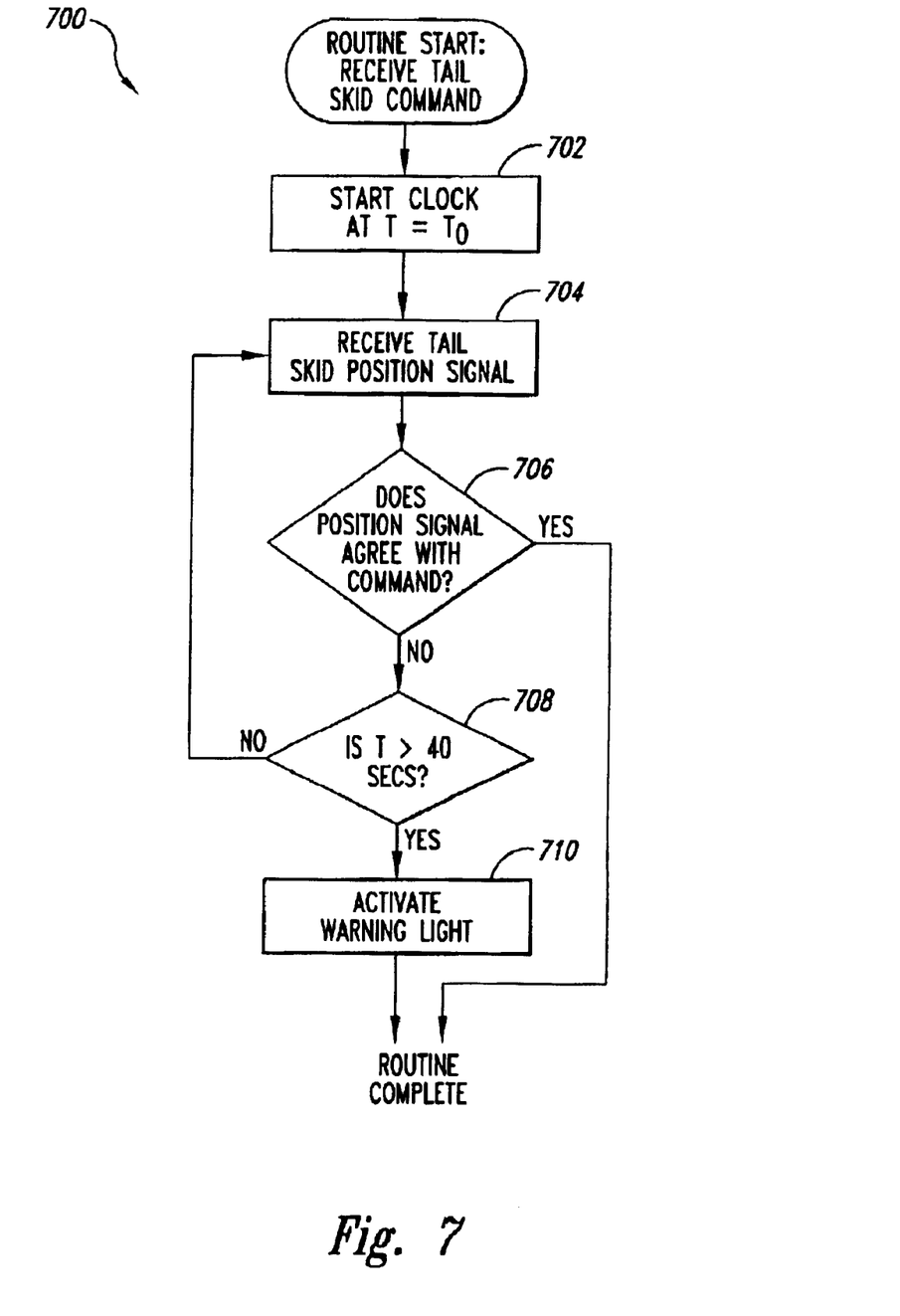
FIG. 7 is a flow diagram illustrating a routine for operating a tail skid warning light in accordance with an embodiment of the invention.

FIG. 7 is a flow diagram illustrating a routine 700 for operating a tail skid warning light (e.g., the warning light 403 of FIG. 4) in accordance with an embodiment of the invention. In one aspect of this embodiment, the routine 700 starts when it receives a tail skid position command (e.g., an up command or a down command). In block 702, the routine 700 starts a timer. In block 704, the routine 700 receives a tail skid position signal (from, e.g., the skid position sensor 420 of FIG. 4) indicating the position of the tail skid. In decision block 706, the routine 700 determines whether the tail skid position as indicated by the position signal agrees with the tail skid command. If the tail skid position does agree with the tail skid command, then the routine 700 is complete. If not, then the routine 700 proceeds to decision block 708 to determine whether the elapsed time from block 702 is greater than a preselected time limit. For example, in one embodiment, the preselected time limit may be greater than 40 seconds. In other embodiments, other time periods can be selected depending on the extension and retraction rate of the particular tail skid. In decision block 708, if the elapsed time is less than or equal to 40 seconds, then the routine returns to block 704 to again check the tail skid position. The routine 700 then repeats from block 704 until the tail skid position agrees with the command, in which case the routine 700 is complete, or until the elapsed time exceeds 40 seconds. If the elapsed time exceeds 40 seconds, then the routine 700 proceeds to block 710 and activates the warning light. As mentioned above, the pilot may elect to modify the particular flight mode if the warning light indicates that the tail skid is not in the proper position.

The foregoing flow routines described with reference to FIGS. 5–7 illustrate but one set of routines that can be used to control and monitor the tail skid assembly 110 in accordance with an embodiment of the invention. In other embodiments, other routines can be used to control and monitor the tail skid assembly 110. For example, in one such embodiment the decision to deploy the tail skid assembly 110 could be made by the pilot instead of an automated routine. In this example, the pilot lowers or raises the tail skid assembly as appropriate for the particular flight mode. In yet other embodiments, the particular parameters associated with the various flight systems can change from those discussed above with reference to FIGS. 5–7. For example, although a throttle lever position of less than 53° may be indicative of landing on a particular type of aircraft, other aircraft may have other throttle lever positions indicative of landing. Similarly, other aircraft may elect to use wheel speeds other than 60 knots in combination with the throttle lever position. Accordingly, operation of a tail skid assembly in accordance with the present disclosure is not limited to the parameters and routines described above with reference to FIGS. 5–7.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A tail skid assembly for use with an aircraft having a fuselage and a main wing, the aircraft further having a main landing gear extendable downward from at least proximate to the main wing, and a nose landing gear extendable downward from a forward portion of the fuselage, the tail skid assembly comprising:
- a skid member having first and second portions, the first portion configured to be coupled to the fuselage aft of the main landing gear and the second portion being movable relative to the fuselage, the second portion supporting a skid surface; and
- a skid deployment system operably connected to the skid member to move the skid surface between first and second positions, wherein the first and second portions of the skid member are telescopically coupled and configured to extend and retract along a longitudinal axis to move the skid surface between the first and second positions, wherein when the skid surface is in the first position the skid surface is closer to the aft portion of the fuselage than when the skid surface is in the second position, and wherein the skid surface is configured to contact a surface of a runway when the skid surface is in the first and second positions.

2. The tail skid assembly of claim 1 wherein the first portion of the skid member is configured to be fixedly attached to the aft portion of the fuselage.

3. The tail skid assembly of claim 1, further comprising an energy-absorbing member operatively coupled between the skid deployment system and the skid surface, wherein the energy-absorbing member is configured to absorb at least a portion of the energy caused by contact of the skid surface with a surface of a runaway when the skid surface is in the first and second positions.

4. The tail skid assembly of claim 1, further comprising a fairing at least partially attached to the skid member and configured to reduce aerodynamic drag caused by the skid member.

5. The tail skid assembly of claim 1, further comprising a fairing at least partially attached to the skid member and configured to reduce aerodynamic drag caused by the skid member, wherein the fairing includes the skid surface.

6. A tail skid assembly for use with an aircraft having a fuselage, a nose landing gear extendable downward from a forward portion of the fuselage, and a main landing gear extendable downward aft of the nose landing gear, the tail skid assembly comprising:
- a skid member having first and second portions, the second portion supporting a skid surface configured to contact a surface of a runway, the first portion being configured to be pivotally attached to the fuselage aft of the main landing gear and movable about a skid pivot axis relative to the fuselage;
- a skid deployment system configured to be operably attached to the fuselage aft of the main landing gear at least proximate to the skid member, the skid deployment system including at least a first linkage configured to be pivotally movable about a linkage pivot axis; and
- a compression member having first and second end portions, the first end portion being operably coupled to the first linkage and the second end portion being operably coupled to the skid member, wherein operation of the skid deployment system causes the compression member to move the skid member between retracted and extended positions, wherein when the skid member is in the retracted position the skid surface is closer to the aft portion of the fuselage than when the skid member is in the extended position, and wherein the compression member is configured to absorb at least a portion of the energy caused by contact of the skid surface with a surface of a runaway when the skid member is in the retracted and extended positions.

7. The tail skid assembly of claim 6 wherein the skid surface is a non-rolling surface.

8. The tail skid assembly of claim 6 wherein the first portion of the skid member pivots downwardly about a skid pivot axis to move the skid surface from the first position to the second position.

9. The tail skid assembly of claim 6, further comprising a fairing at least partially attached to the skid member and configured to reduce aerodynamic drag caused by the skid member, wherein the skid member and the fairing pivot downwardly about the skid pivot axis to move the skid member from the retracted position to the extended position.

10. The tail skid assembly of claim 6 wherein the compression member further includes a compressible portion positioned between the first and second end portions, wherein the compressible portion is configured to absorb at least a portion of the energy resulting from contact of the skid surface with a surface of a runway.

11. The tail skid assembly of claim 6 wherein the compression member further includes a compressible honeycomb portion positioned between the first and second end portions, wherein the compressible honeycomb portion is configured to absorb at least a portion of the energy resulting from contact of the skid surface with a surface of a runway.

12. The tail skid assembly of claim 6 wherein the compression member further includes a replaceable cartridge carrying an energy-absorbing portion, wherein the energy-absorbing portion is configured to absorb at least a portion of the energy caused by contact of the skid surface with a surface of a runway, and wherein the compression member is configured to have the cartridge replaced after the skid surface has contacted the surface of the runway.

13. The tail skid assembly of claim 6, further comprising a fairing covering at least a portion of the skid member when the skid member is in the retracted position.

14. A method for preventing damage to an aircraft from incidental runway contact during takeoff and landing operations, the aircraft having a fuselage, a main wing attached to the fuselage, a main landing gear extendable downward from at least proximate to the main wing, and a nose landing gear extendable downward from a forward portion of the fuselage, the method comprising:
- moving a skid surface to a first position relative to the fuselage for takeoff of the aircraft, the aircraft including a skid member having first and second portions, the first portion being coupled toward an aft portion of the fuselage and the second portion supporting the skid surface and being movable relative to the aft portion of the fuselage; and
- moving the skid surface to a second position relative to the fuselage for landing of the aircraft, wherein when the skid surface is in the first position the skid surface is closer to the aft portion of the fuselage than when the skid surface is in the second position, and wherein the skid surface is configured to contact a surface of a runway when the skid surface is in the first and second positions.

15. The method of claim 14 wherein moving the skid surface to the first position includes pivoting the skid member upwardly relative to the fuselage about a skid pivot axis, and wherein moving the skid surface to the second position includes pivoting the skid member downwardly relative to the fuselage about the skid pivot axis.

16. The method of claim 14 wherein moving the skid surface to the second position includes pivoting the skid member and a fairing downwardly relative to the fuselage about the skid pivot axis, wherein the fairing is configured to reduce aerodynamic drag on the skid member.

17. The method of claim 14 wherein moving the skid surface to the second position includes moving a nickel alloy surface to the second position.

18. A method for protecting an aft body contact point on a fuselage of an aircraft during takeoff and landing operations, the aircraft having a main wing, a main landing gear extendable downward from at least proximate to the main wing, and a nose landing gear extendable downward from a forward portion of the fuselage, the method comprising:
  moving a skid surface configured to contact a surface of a runway to a retracted position relative to the aircraft fuselage for takeoff of the aircraft, the aircraft including a skid member having first and second portions, the second portion supporting the skid surface, the skid member being pivotally attached to the fuselage aft of the main landing gear and movable about a skid pivot axis; and
  moving the skid surface to an extended position relative to the aircraft fuselage for landing of the aircraft, wherein when the skid surface is in the retracted position the skid surface is closer to the aft portion of the fuselage than when the skid surface is in the extended position, and wherein the skid surface is configured to contact a surface of a runway when the skid surface is in the retracted and extended positions.

19. The method of claim 18 wherein moving the skid surface to the extended position for landing of the aircraft includes automatically moving the skid surface to the extended position at least partially in response to a signal indicating that a landing gear lever is in a down position.

20. The method of claim 18 wherein moving the skid surface to the extended position for landing of the aircraft includes automatically moving the skid surface to the extended position at least partially in response to a signal indicating that one or more throttle levers are set to a position less than a preselected position.

21. The method of claim 18 wherein moving the skid surface to the retracted position for takeoff of the aircraft includes automatically moving the skid surface to the retracted position at least partially in response to a flight mode of the aircraft.

22. The method of claim 18 wherein moving the skid surface to the retracted position for takeoff of the aircraft includes automatically moving the skid surface to the retracted position at least partially in response to a signal indicating that weight has been on wheels of the main landing gear for more than a preselected period of time.

23. The method of claim 18 wherein moving the skid surface to the retracted position for takeoff of the aircraft includes automatically moving the skid surface to the retracted position at least partially in response to a signal indicating that one or more throttle levers are set to a preselected position.

24. The method of claim 18 wherein moving the skid surface to the extended position for landing of the aircraft includes automatically moving the skid surface to the extended position at least partially in response to a signal indicating that the aircraft has been airborne for more than a preselected period of time.

25. A method for protecting an aft body contact point on a fuselage of an aircraft during takeoff and landing operations, the aircraft having a main wing, a main landing gear extendable downward from at least proximate to the main wing, and a nose landing gear extendable downward from a forward portion of the fuselage, the method comprising:
  moving a skid surface configured to contact a surface of a runway to a retracted position relative to the aircraft fuselage for takeoff of the aircraft, the aircraft including a skid member having first and second portions, the second portion supporting the skid surface, the skid member being pivotally attached to the fuselage aft of the main landing gear and movable about a skid pivot axis; and
  moving the skid surface to an extended position relative to the aircraft fuselage for landing of the aircraft, wherein when the skid surface is in the retracted position the skid surface is closer to the aft portion of the fuselage than when the skid surface is in the extended position, wherein moving the skid surface to the retracted position for takeoff of the aircraft includes automatically moving the skid surface to the retracted position at least partially in response to a signal indicating that weight has been on wheels of the main landing gear for more than a preselected period of time.

26. The method of claim 25 wherein moving the skid surface to the retracted position for takeoff of the aircraft includes automatically moving the skid surface to the retracted position at least partially in response to a signal indicating that weight has been on wheels of the main landing gear for more than about five seconds.

27. A method for protecting an aft body contact point on a fuselage of an aircraft during takeoff and landing operations, the aircraft having a main wing, a main landing gear extendable downward from at least proximate to the main wing, and a nose landing gear extendable downward from a forward portion of the fuselage, the method comprising:
  moving a skid surface configured to contact a surface of a runway to a retracted position relative to the aircraft fuselage for takeoff of the aircraft, the aircraft including a skid member having first and second portions, the second portion supporting the skid surface, the skid member being pivotally attached to the fuselage aft of the main landing gear and movable about a skid pivot axis; and
  moving the skid surface to an extended position relative to the aircraft fuselage for landing of the aircraft, wherein when the skid surface is in the retracted position the skid surface is closer to the aft portion of the fuselage than when the skid surface is in the extended position, wherein moving the skid surface to the retracted position for takeoff of the aircraft includes automatically moving the skid surface to the retracted position at least partially in response to a signal indicating that one or more throttle levers are set to a position greater than a preselected position.

28. The method of claim 27 wherein moving the skid surface to the retracted position for takeoff of the aircraft includes automatically moving the skid surface to the retracted position at least partially in response to a signal indicating that one or more throttle levers are set to a position greater than about 53°.

29. A method for protecting an aft body contact point on a fuselage of an aircraft during takeoff and landing operations, the aircraft having a main wing, a main landing gear extendable downward from at least proximate to the main wing, and a nose landing gear extendable downward from a forward portion of the fuselage, the method comprising:
  moving a skid surface configured to contact a surface of a runway to a retracted position relative to the aircraft fuselage for takeoff of the aircraft, the aircraft including a skid member having first and second portions, the second portion supporting the skid surface, the skid member being pivotally attached to the fuselage aft of the main landing gear and movable about a skid pivot axis; and moving the skid surface to an extended position relative to the aircraft fuselage for landing of the aircraft, wherein when the skid surface is in the retracted position the skid surface is closer to the aft portion of the fuselage than when the skid surface is in the extended position, wherein moving the skid surface to the extended position for landing of the aircraft includes automatically moving the skid surface to the extended position at least partially in response to a signal indicating that the aircraft has been airborne for more than a preselected period of time.

30. The method of claim 20 wherein moving the skid surface includes moving a non-rolling surface configured to contact a surface of a runway.

31. A system for preventing damage to an aircraft from incidental runway contact during takeoff and landing operations, the aircraft having a fuselage, a main wing attached to the fuselage, a main landing gear extendable downward from at least proximate to the main wing, and a nose landing gear extendable downward from a forward portion of the fuselage, the system comprising:

contact means for contacting a runway surface; and means for moving the contact means to a first position for takeoff of the aircraft and to a second position for landing of the aircraft, the aircraft including a skid member having first and second portions, the first portion being attached toward an aft portion of the fuselage, the second portion supporting the contact means and being movable relative to the aft portion of the fuselage, wherein when the contact means are in the first position the contact means are closer to the aft portion of the fuselage than when the contact means are in the second position, and wherein the contact means are configured to contact a surface of a runway when the contact means are in the first and second positions.

32. The system of claim 31 wherein the means for moving the contact means to the first position includes means for pivoting the skid member upwardly relative to the fuselage, and wherein the means for moving the contact means to the second position includes means for pivoting the skid member downwardly relative to the fuselage.

33. The system of claim 31 wherein the means for moving the contact means to the second position include means for pivoting the skid member and a fairing downwardly relative to the fuselage about the skid pivot axis, wherein the fairing is configured to reduce aerodynamic drag on the skid member.

34. A system for preventing damage to an aircraft fuselage from incidental runway contact during takeoff and landing operations, the system comprising:

contact means for contacting a runway surface; and means for moving the contact means to a first position for takeoff of the aircraft and to a second position for landing of the aircraft, the aircraft including a skid member having first and second portions, the first portion being attached toward an aft portion of the fuselage, the second portion supporting the contact means and being movable relative to the aft portion of the fuselage, wherein when the contact means are in the first position the contact means are closer to the aft portion of the fuselage than when the contact means are in the second position, wherein the means for moving the contact means to the first position for takeoff of the aircraft include means for automatically moving the contact means to the first position at least partially in response to a signal indicating that weight has been on wheels of a main landing gear for more than a preselected period of time.

35. The system of claim 34 wherein the means for moving the contact means to the first position include means for pivoting the skid member upwardly relative to the fuselage, and wherein the means for moving the contact means to the second position include means for pivoting the skid member downwardly relative to the fuselage.

36. A system for preventing damage to an aircraft fuselage from incidental runway contact during takeoff and landing operations, the system comprising:

contact means for contacting a runway surface; and means for moving the contact means to a first position for takeoff of the aircraft and to a second position for landing of the aircraft, the aircraft including a skid member having first and second portions, the first portion being attached toward an aft portion of the fuselage, the second portion supporting the contact means and being movable relative to the aft portion of the fuselage, wherein when the contact means are in the first position the contact means are closer to the aft portion of the fuselage than when the contact means are in the second position, wherein the means for moving the contact means to the first position for takeoff of the aircraft include means for automatically moving the contact means to the first position at least partially in response to a signal indicating that one or more throttle levers are set to a position greater than a preselected position.

37. The system of claim 36 wherein the means for moving the contact means to the first position include means for pivoting the skid member upwardly relative to the fuselage, and wherein the means for moving the contact means to the second position includes means for pivoting the skid member downwardly relative to the fuselage.

38. A system for preventing damage to an aircraft fuselage from incidental runway contact during takeoff and landing operations, the system comprising:

contact means for contacting a runway surface; and means for moving the contact means to a first position for takeoff of the aircraft and to a second position for landing of the aircraft, the aircraft including a skid member having first and second portions, the first portion being attached toward an aft portion of the fuselage, the second portion supporting the contact means and being movable relative to the aft portion of the fuselage, wherein when the contact means are in the first position the contact means are closer to the aft portion of the fuselage than when the contact means are in the second position, wherein the means for moving the contact means to the second position for landing of the aircraft include means for automatically moving the contact means to the second position at least partially in response to a signal indicating that a landing gear lever is in a down position.

39. The system of claim 38 wherein the contact means include non-rolling means configured to contact a surface of a runway.

40. An aircraft comprising:

a fuselage;

a nose landing gear extendable downward from a forward portion of the fuselage;

a main landing gear extendable downward aft of the nose landing gear;

a skid member having first and second portions, the first portion configured to be coupled to the fuselage aft of the main landing gear and the second portion being movable relative to the fuselage, the second portion supporting a skid surface;

a skid deployment system configured to be operably attached to the fuselage aft of the main landing gear at least proximate to the skid member, the skid deployment system including at least a first linkage configured to be pivotally movable about a linkage pivot axis; and a compression member having first and second end portions, the first end portion being operably coupled to the first linkage and the second end portion being operably coupled to the skid member, wherein operation of the skid deployment system causes the compression member to move the skid member between retracted and extended positions, wherein when the skid member is in the retracted position the skid surface is closer to the aft portion of the fuselage than when the skid member is in the extended position, and wherein the compression member is configured to absorb at least a portion of the energy caused by contact of the skid surface with a surface of a runway when the skid member is in the retracted and extended positions.

41. The aircraft of claim 40 wherein the fuselage includes an aft body contact point, wherein the skid member is pivotally attached to the fuselage aft of the aft body contact point.

42. The aircraft of claim 40 wherein the fuselage includes an aft body contact point, the aft body contact point being a point at which the fuselage would contact a runway surface if the fuselage rotated nose-upwardly about the main gear in the absence of a tail skid, wherein when the skid member is in the retracted position the skid surface prevents the aft body contact point from contacting the runway surface during takeoff of the aircraft, and wherein when the skid member is in the extended position the skid surface prevents the aft body contact point from contacting the runway during landing of the aircraft.

43. The aircraft of claim 40, further comprising:

at least one engine mounted to at least one of a main wing and the fuselage;

at least one landing wheel rotatably mounted to at least one of the main landing gear and the nose landing gear;

at least one throttle operatively connected to the at least one engine;

at least one landing gear lever operatively connected to at least one of the main landing gear and the nose landing gear; and a tail skid control system operatively connected to the skid deployment system and at least one of the engine, the landing wheel, the throttle, and the landing gear, wherein the tail skid control system is configured to automatically control movement of the skid member between the retracted and extended positions based on one or more signals received from at least one of the engine, the landing wheel, the throttle, and the landing gear lever.

44. The aircraft of claim 40, further comprising:

at least one engine mounted to at least one of a main wing and the fuselage;

at least one landing wheel rotatably mounted to at least one of the main landing gear and the nose landing gear;

at least one throttle operatively connected to the at least one engine;

at least one landing gear lever operatively connected to at least one of the main landing gear and the nose landing gear; and a tail skid control system operatively connected to the skid deployment system, the landing wheel, the throttle, and the landing gear, wherein the tail skid control system is configured to automatically control movement of the skid member between the retracted and extended positions based on one or more signals received from the engine, the landing wheel, the throttle, and the landing gear lever.

45. An aircraft comprising:

a fuselage;

a nose landing gear extendable downward from a forward portion of the fuselage;

a main landing gear extendable downward aft of the nose landing gear;

a skid member having first and second portions, the first portion configured to be coupled to the fuselage aft of the main landing gear and the second portion being movable relative to the fuselage, the second portion supporting a skid surface;

a skid deployment system operably connected to the skid member to move the skid surface between first and second positions, wherein when the skid surface is in the first position the skid surface is closer to the aft portion of the fuselage than when the skid surface is in the second position, and wherein the skid surface is configured to contact a surface of a runway when the skid surface is in the first and second positions; and a tail skid control system operatively connected to the skid deployment system and one or more flight systems of the aircraft, wherein the tail skid control system is configured to automatically control movement of the skid member between the retracted and extended positions based on one or more signals received from the one or more flight systems of the aircraft.

46. The aircraft of claim 45, further comprising:

a wing extending outwardly from the fuselage; and at least one jet engine attached to the wing.

47. The aircraft of claim 45, wherein the skid surface includes a non-rolling surface.

48. An aircraft comprising:

a fuselage;

a nose landing gear extendable downward from a forward portion of the fuselage;

a main landing gear extendable downward aft of the nose landing gear;

a skid member having first and second portions, the first portion configured to be coupled to the fuselage aft of the main landing gear and the second portion being movable relative to the fuselage, the second portion supporting a skid surface;

a skid deployment system operably connected to the skid member to move the skid surface between first and second positions, wherein when the skid surface is in the first position the skid surface is closer to the aft portion of the fuselage than when the skid surface is in the second position, and wherein the skid surface is configured to contact a surface of a runway when the skid surface is in the first and second positions;

at least one engine mounted to at least one of a main wing and the fuselage;

at least one landing gear lever operatively connected to at least one of the main landing gear and the nose landing gear; and a tail skid control system operatively connected to the skid deployment system and at least one of the engine and the landing gear lever, wherein the tail skid control system is configured to automatically control movement of the skid member between the retracted and extended positions based on one or more signals received from at least one of the engine and the landing gear lever.

49. The aircraft of claim 48 wherein the skid member is pivotally attached to the fuselage.

* * * * *